(12) United States Patent
Fry

(10) Patent No.: US 7,477,421 B2
(45) Date of Patent: Jan. 13, 2009

(54) HALFTONING SYSTEM

(75) Inventor: Robert A. Fry, Ryde (AU)

(73) Assignees: Kabushiki Kaisha Toshiba (JP);
Toshiba Tec Kabushiki Kaisha (JP)

( * ) Notice: Subject to any disclaimer, the term of this patent is extended or adjusted under 35 U.S.C. 154(b) by 661 days.

(21) Appl. No.: 11/051,855

(22) Filed: Feb. 4, 2005

(65) Prior Publication Data

US 2006/0176518 A1    Aug. 10, 2006

(51) Int. Cl.
*G06K 15/00* (2006.01)
*H04N 1/405* (2006.01)
*H04N 1/46* (2006.01)

(52) U.S. Cl. .................................. 358/3.06; 358/534

(58) Field of Classification Search ............. 358/1.9, 358/3.03–3.16, 534, 535, 536
See application file for complete search history.

(56) References Cited

U.S. PATENT DOCUMENTS

| 5,542,029 | A * | 7/1996 | Karlsson ............... 358/1.9 |
| 2003/0133161 | A1 | 7/2003 | Harrington |
| 2004/0011233 | A1 | 1/2004 | Hains |
| 2004/0051884 | A1 | 3/2004 | Saxton |

* cited by examiner

*Primary Examiner*—Douglas Q Tran
(74) *Attorney, Agent, or Firm*—Tucker Ellis & West LLP

(57) ABSTRACT

A method for mapping a point (pixel) outside a halftone cell to a point inside the halftone cell by determining the size of a rectangle which is tiled exactly by the halftone cell. If the size of the rectangle permits, a threshold array is employed to render the pixel. Otherwise, the pixel is rendered by calculating four potential solutions and selecting one of the four potential solutions based on the where the four potential solutions are located with respect to the halftone cell.

7 Claims, 4 Drawing Sheets

HALFTONING SYSTEM

BACKGROUND OF THE INVENTION

The present invention relates generally to output devices and more specifically to halftoning.

According to the Postscript Language Reference Manual, "[h]alftoning is a process by which continuous tone colors are approximated on an output device that can achieve only a limited number of discrete colors. Colors that the device cannot produce directly are simulated by using patterns of pixels in the colors available."

Some output devices can reproduce continuous-tone colors directly. Halftoning is not required for such devices. After gamma correction by the transfer functions, the color components are transmitted directly to the device. On devices that do require halftoning, it occurs after all color components have been transformed by the applicable transfer functions. The input to the halftone function consists of continuous tone gamma-corrected color components in the device's native color space. Its output consists of pixels in colors that the device can reproduce.

Halftones are a device dependent mechanism used to allow users of devices with a relatively small number of colors and/or low resolution to exercise fine control over how colors and grays appear when output. They are sometimes used to implement special effects (such as patterns) as well.

Halftones are defined in PostScript using the notion of a halftone screen, which divides an array of device pixels (an area on the screen) into cells which may be modified to produce the desired halftone effects. Each device pixel belongs to one cell of the screen; a single cell typically contains many pixels. On a black and white device, each cell can be made to simulate a given value of gray by producing some of the cell's device pixels black and others white. Numerically, the gray level produced is the relation between the area of the cell which is white to the total area of the cell. Unfortunately, this is not necessarily the relation between the number of white pixels and the number of pixels in the cell because of common interactions between bits of ink and how the ink is made to stick to the page.

The above description also applies to color devices whose pixels consist of colorants that are either completely on or completely off. Most color printers, but not color displays, work this way. Halftoning is applied to each color component independently, producing shades of that color. The need to control interactions between the color screens for each component is a major part of why many users demand a high level of control over the halftoning process.

In general, Postscript Halftones are defined in one of two ways: 1) a frequency, angle and spot function combination; or 2) with a threshold array. The first method mimics the method found in classical photographic processes wherein each halftone cell is conceived of as a region of the screen which is colored by a "spot" whose size and shape is specified by the spot function. The size and position of each cell is defined by the frequency and angle supplied. With digital devices, a complication occurs when trying to determine which image pixels to go which halftone cell. Selecting which ones to color for a given shade of gray is essentially arbitrary. This exacerbates any problems due to "beat" patterns when using different halftone colors to overlay each other.

A threshold array assumes a fixed size for the halftone cells, and defines exactly which ones to color for a given shade of gray. An advantage of threshold arrays is that it is very simple to represent them as a region of memory on a computer. They may be efficiently rendered on such devices as well. A drawback of a threshold array is that it can be difficult to exactly represent screens at arbitrary angles or with non-square spot shapes due to shapes not lining up accurately with the device pixel grid. Postscript defines Halftone types 10 and 16 to allow the description of screens at arbitrary rational angles, but at the expense of making the rectangular region of memory needed to represent them accurately being very large. As a result, many existing systems use methods to approximate these halftones. As a result, Postscript halftone types 10 and 16 are often not rendered exactly using a threshold array.

The Type 10 halftone addresses the difficulty of representing halftone cells at arbitrary angles by dividing the cell into a pair of squares of different sizes. As a result, determining quickly what pixel of the halftone cell should be colored by a given device pixel has proven to be a time-consuming task. The squares are much easier to store and specify than a threshold map would be if stored at an angle, although they present challenges to some rendering engines. Type 16 halftones are similar to type 10 halftones, except that the two squares are more generalized as two arbitrary sized rectangles.

Existing implementations of these types of halftone cells determine whether and how a given device pixel should be colored by calculating the pixel's location within the squares (or rectangles). If the pixel's location is outside the (X,Y) coordinates of those squares (or rectangles) when centered at the page's origin, some existing implementations subtract the horizontal and vertical displacements between cells repeatedly until the pixel is within the cell's area. Other implementations simply approximate the pixel's location as a larger square (or rectangle) that overlaps itself. However, both of these implementations are slow due to repeated calculations of either the duplicated pixels or due to the iterative stepping towards the origin until valid coordinates are reached. In addition, the "large rectangle" implementation has the drawback that the large rectangle does not line up on the same device pixels as the type 10 cells would, yielding artifacts around the edges of the cells.

BRIEF SUMMARY OF THE INVENTION

The present invention provides a method and system for quickly calculating a pixel's position relative to a base cell which is useful for halftoning and other similar output operations. The size of a rectangle that is tiled exactly by a halftone cell is determined. If the size of the rectangle is small enough, the a threshold array is used. If the size of rectangle is too large, cell locations can be calculated based on an algorithm in accordance with the present invention. The algorithm provides a plurality of potential solutions, thus the plurality of potential solutions are computed and the solution that bests suits the need of the output job is selected.

In accordance with an aspect of the present invention, there is described herein a method for mapping a pixel outside a halftone cell to a pixel inside the halftone cell. The method comprises determining the size of a rectangle which is tiled exactly by the halftone cell. The method further comprises using a threshold array to render the pixel when the size of the rectangle size permits, and calculating a plurality of potential solutions for rendering the pixel when the size of the rectangle is too large for a threshold array and selecting one of the potential solutions based on the locations of the plurality of potential solutions with respect to the halftone cell.

In accordance with another aspect of the present invention, there is described herein a device for halftoning comprising an output engine, a control unit and a communication unit.

The control unit is coupled to the output engine and the communications interface is coupled to the output engine and the control unit. The control unit is configured to receive an image from the communication interface and to produce a halftone facsimile of the image via the output engine by defining a halftone screen, defining a halftone cell within the halftone screen, and mapping a pixel outside the halftone cell and within the halftone screen to a point within the halftone cell. The control unit being further configured to map the pixel by determining the size of a rectangle which is tiled exactly by the halftone cell. The control unit is further configured to use a threshold array to render the pixel when the size of the rectangle size permits, or by calculating a plurality of potential solutions for rendering the pixel when the size of the rectangle is to large for a threshold array, and selecting a one of the plurality potential solutions based on the locations of the plurality potential solutions with respect to the halftone cell.

In accordance with an aspect of the present invention, there is disclosed herein a computer readable medium of instructions stored on a computer readable medium. The instructions comprising means for defining a halftone cell within a halftone screen, means for determining the size of a rectangle which is tiled exactly by the halftone cell, and means for mapping a pixel outside the halftone cell and within the halftone screen to a point inside the halftone cell. The means for mapping comprising means for using a threshold array to render the pixel when the rectangle size permits. The means for mapping further comprising means for calculating four potential solutions for rendering the pixel when the size of the rectangle is too large for a threshold array and selecting a one of the four potential solutions based on the locations of the four potential solutions with respect to the halftone cell.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
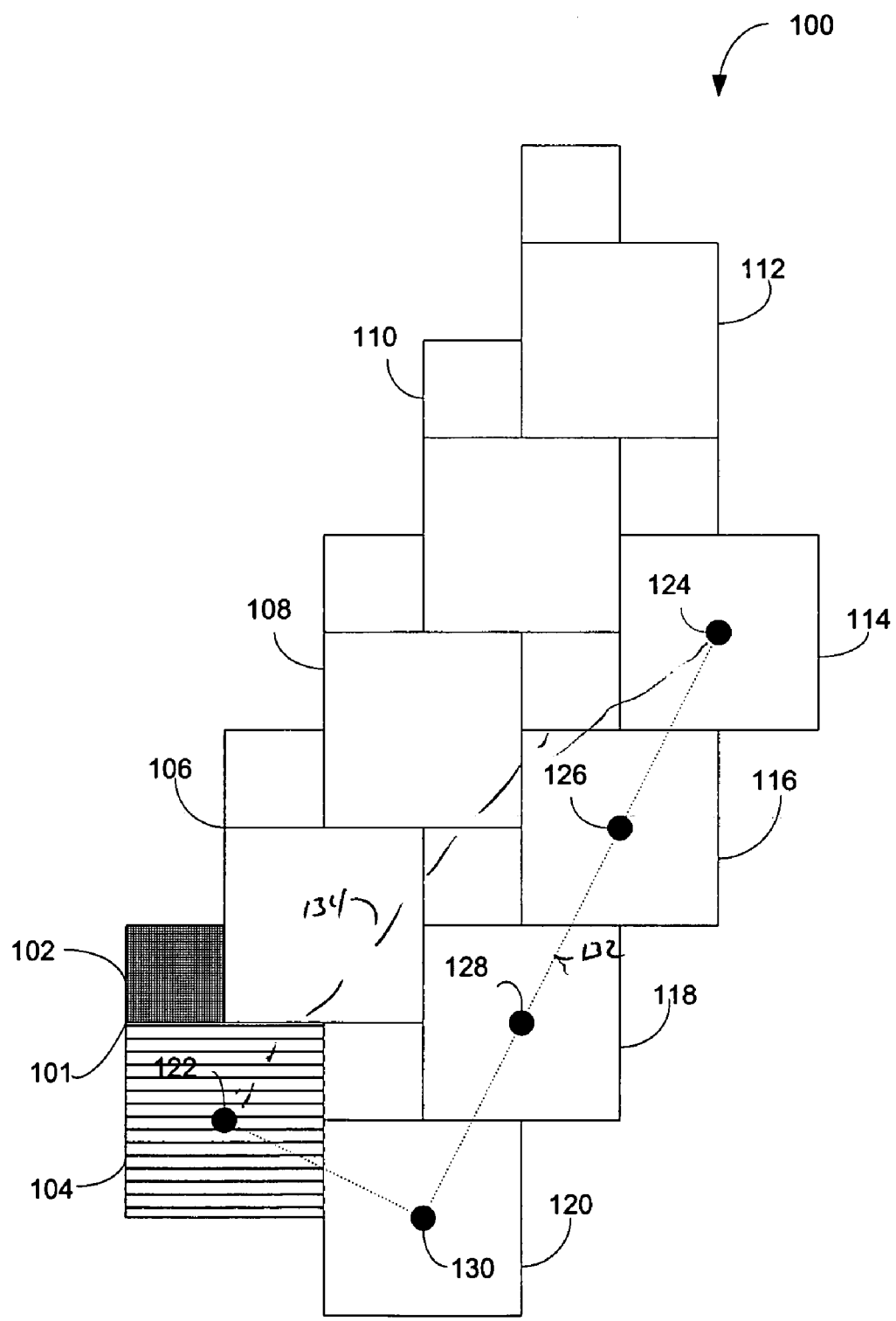
FIG. 1 is a block diagram of a halftone screen comprising a replicated halftone cell.

Throughout this description, the preferred embodiment and examples shown should be considered as exemplars, rather than limitations, of the present invention. The present invention, in accord with an aspect, provides a method and system for quickly calculating a pixel's position relative to a base cell which is useful for halftoning and other similar output operations. The size of a rectangle that is tiled exactly by a halftone cell is determined. If the size of the rectangle is small enough, the a threshold array is used. If the size of rectangle is too large, cell locations can be calculated based on an algorithm in accordance with the present invention. The algorithm provides a plurality of potential solutions, thus the plurality of potential solutions are computed and the solution that bests suits the need of the output job is selected.

Halftones are defined in device space, unaffected by the current transformation matrix. For correct results, a program that defines a new halftone, such as a PostScript program, should know the resolution and orientation of device space. The best choice of halftone parameters often depends on specific physical properties of the output device, such as pixel shape, overlap between pixels, and effects of electronic or mechanical noise.

In general, halftoning methods are based on the notion of a halftone screen, which divides the array of device pixels into cells that can be modified to produce the desired halftone effects. Postscript uses halftone dictionaries to control the halftoning process. A halftone dictionary is a dictionary object whose entries are parameters to the halftoning machinery. A current halftone dictionary specifies the halftoning process to be used by the painting operators. Some of the entries in the dictionary can be procedures that are called to perform computations. Such procedures compute results that depend only on information in the halftone dictionary and not on outside information such as the graphics state itself and should not have side effects.

Table 1, below describes the contents of a type 3 halftone dictionary. A type 3 dictionary defines a halftone screen with a threshold array. The Width and Height entries specify the dimensions of the array in device pixels. The contents of the array are given by a string object in the dictionary's 'Thresholds' entry, with each byte in the string representing a single 8-bit threshold value.

TABLE 1

Entries in a type 3 halftone dictionary:

| KEY | TYPE | VALUE |
|---|---|---|
| HalftoneType | integer | (Required) A code identifying the halftone type that this dictionary describes; must be 3 for this type of halftone. |
| HalftoneName | name or string | (Optional; LanguageLevel 3) The name of the halftone dictionary. Returned string by the GetHalftoneName procedure and used by find colorrendering in constructing the name of a color rendering dictionary. |
| Width | integer | (Required) The width of threshold array, in device pixels. |
| Height | integer | (Required) The height of threshold array, in device pixels. |
| Thresholds | string | (Required) A string containing threshold values. The string contains Width × Height bytes of threshold data. Each byte represents a single threshold value, defined in the same order as samples in a sampled image: the first value is at device coordinates (0, 0), and horizontal coordinates change faster than vertical. |
| TransferFunction | procedure | (Optional) A transfer function that overrides the one specified by settransfer of set color transfer. |

Although a Type 3 halftone dictionary can be used to specify a threshold array with a zero screen angle, there is no provision for other angles. The Type 10 halftone dictionary removes this restriction and allows the use of threshold arrays for halftones with nonzero screen angles as well. Halftone cells at nonzero angles can be difficult to specify, because they may not line up well with scan lines and because it may be difficult to determine where a given sampled point goes. The Type 10 halftone dictionary addresses these difficulties by dividing the halftone cell into a pair of squares that line up at zero angles with the output device's pixel grid. The squares contain the same information as the original cell, but are much easier to store and manipulate. In addition, they can be mapped easily into the internal representation used for all rendering.

FIG. 1 shows how the halftone cell 101 can be divided into two cells 102, 104, which are shown as squares. If the squares and the original cell are tiled across device space, the area to the right of the upper square maps exactly into the empty area of the lower square, and vice versa.

Any halftone cell can be divided in this way. The side of the upper square (X) 102 is equal to the horizontal displacement from a point in one halftone cell to the corresponding point in the adjacent cell. The side of the lower square (Y) 104 is the vertical displacement between the same two points. The frequency of a halftone screen constructed from squares X and Y is thus given by $$\text{frequency} = \frac{\text{resolution}}{\sqrt{X^2 + Y^2}}$$

and the angle by $$\text{angle} = \arctan\left(\frac{y}{x}\right).$$

Table 2 describes the contents of a Type 10 dictionary.

TABLE 2

Entries in a Type 10 halftone dictionary:

| KEY | TYPE | VALUE |
|---|---|---|
| HalftoneType | integer | (Required) A code identifying the halftone type that this dictionary describes; must be 10 for this type of halftone. |
| HalftoneName | name or string | (Optional) The name of the halftone dictionary stringReturned by the GetHalftonestring procedure and used by findcolorrendering in constructing the name of a color rendering dictionary. |
| Xsquare | integer | (Required) The side of square X, in device pixels. |
| Ysquare | integer | (Required) The side of square Y, in device pixels. |
| Thresholds | string or file | (Required) A string or file containing threshold values, as in a type 3 or type 6 halftone, respectively. If a string, it must contain Xsquare 2 × Ysquare 2 bytes of threshold data; if a file, the stream must contain at least that many bytes. In either case, the contents of square X are specified first, followed by those of square Y. Threshold values within each square are defined in the same order as samples in a sampled image, with the first value at device coordinates (0, 0) and horizontal coordinates changing faster than vertical. If the value of Thresholds is a file, the currenthalftone operator will replace it |

TABLE 2-continued

Entries in a Type 10 halftone dictionary:

| KEY | TYPE | VALUE |
|---|---|---|
| | | with a new file object representing the threshold array. |
| TransferFunction | procedure | (Optional) A transfer function that overrides the one specified by set transfer or set color transfer.. |

Like Type 10, a Type 16 halftone dictionary defines a halftone screen by specifying a threshold array whose contents are taken from a file, and it allows nonzero screen angles. In Type 16, however, each element of the threshold array is 16 bits wide instead of 8. This allows the threshold array to distinguish 65,536 levels of color rather than only 256 levels. Furthermore, Type 16 halftones can use rectangular objects instead of squares. For example in FIG. 1, square 102 can be a rectangular object with a width X1 and a height Y1, and square 104 can be a rectangular object with a width X2 and a height X2. Table 3 shows an example of a type 16 halftone dictionary. Table 3, entries in a Type 16 halftone dictionary:

TABLE 3 entries in a Type 16 halftone dictionary:

| KEY | TYPE | VALUE |
|---|---|---|
| HalftoneType | integer | (Required) A code identifying the halftone type that this dictionary describes; should be 16 for this type of halftone. |
| HalftoneName | name or string | (Optional) The name of the halftone dictionary. Returned by the Get Halftonestring Name procedure and used by findcolorrendering in constructing the name of a color rendering dictionary. |
| Width | integer | (Required) The width of the first (or only) rectangle in the threshold array, in device pixels. |
| Height | integer | (Required) The height of the first (or only) rectangle in the threshold array, in device pixels. |
| Width2 | integer | (Optional) The width of the optional second rectangle in the threshold array, in device pixels. If present, then the Height2 entry must be present as well; if absent, then the Height2 entry must also be absent and the threshold array has only one rectangle. |
| Height2 | integer | (Optional) The height of the optional second rectangle in the threshold array, in device pixels. Thresholds file (Required) An input file from which at least 2 × Width × Height (or 2 × Width × Height 2 × Width 2 × Height 2) bytes of threshold data can be read. Each threshold value is 2 bytes (16 bits) wide, with the high-order byte stored first. The contents of the first rectangle are specified first, followed by those of the second rectangle. Threshold values within each rectangle are defined in the same order as samples in a sampled image, with the first value at device coordinates (0, 0) and horizontal coordinates changing faster than vertical. |
| TransferFunction | procedure | (Optional) A transfer function that overrides the one specified by set transfer or set color transfer. |

FIG. 1 illustrates a halftone screen 100 comprising a halftone cell 101 that is replicated to form halftone screen 100. Halftone cell 101 is comprised of two cells 102 and 104, which are shown as squares. Cells 102 and 104 can also be rectangles, where cell 102 can have a width defined as X1, and a height defined as Y2, and cell 104 can have a width defined as X2, and a height defined as Y2. Screen 100 is filled in by replicating cell 101, the replicated cells are illustrated as cells 106, 108, 112, 114, 116, 118 and 120. Thus, when an output device renders a pixel at 124, it refers to pixel 124's position with respect to cell 101. One approach is to iteratively calculate pixel's 124 position. The iterations start along path 132, and moves equidistant in the same direction, for example from point 124 in cell 114, to point 126 in cell 116, point 128 in cell 118 and to point 130 in cell 120. Cell 120 is adjacent to cell 101, and the iterative process changes directions to follow path 134 to determine that point 124 in cell 114 is the equivalent position of point 124 in cell 101. However, in accordance with an aspect of the present invention, one set of calculations can be performed, transforming point 124 in cell 114 to point 122 in cell 101 as shown by path 134. In transforming point 124 in cell 114 to point 122 in cell 104, a plurality of coefficient can be calculated, K1, K2, K3 and K4 which are described as $$K1 = \left[\frac{X1*y - Y2*x}{X1*Y1 + X2*Y2}\right]$$

$$K2 = \frac{x + K1*X2}{X1}$$

$$K3 = \left[\frac{X1*y - Y2*x - (Y1+Y2)*X1}{X1*Y1 + X2*Y2}\right]$$

$$K4 = \left[\frac{x + K2*X2 - \max(X1, X2)}{X1}\right].$$

Where X1, Y1 are the height and width of cell 102 respectively and X2, Y2 are the height and weight of cell 104 respectively.

When rendering a Type 10 or Type 16 halftone cell, the above formula (for K3, K4) yields a point that is within the range of (0,0) and (max(X1,X2),Y1+Y2). Due to the irregular shape of the halftone cell, this point may be in the desired halftone cell or in one of the adjacent cells (although it is most often within the desired cell). Stepping through the adjacent pixels is a simple calculation once K1-K4 are known, and is faster than traditional iterative processes for any point more than a few halftone cells away from the origin. An example code for selecting the correct point follows.

```
DETERMINE X,Y OF PIXEL
FOR(i=K4; i <=K1; i++)
    FOR(j=k3; j<=k2; j++)
    {
        tmpX = x - i*X1 + j*X2;
        tmpY = y - i*Y2 - j*Y1;
        if(tmpX and tmpY are in the desired cell)
            (X,Y) of Pixel = (tmpX,tmpY);
    }
```

Figure 2:
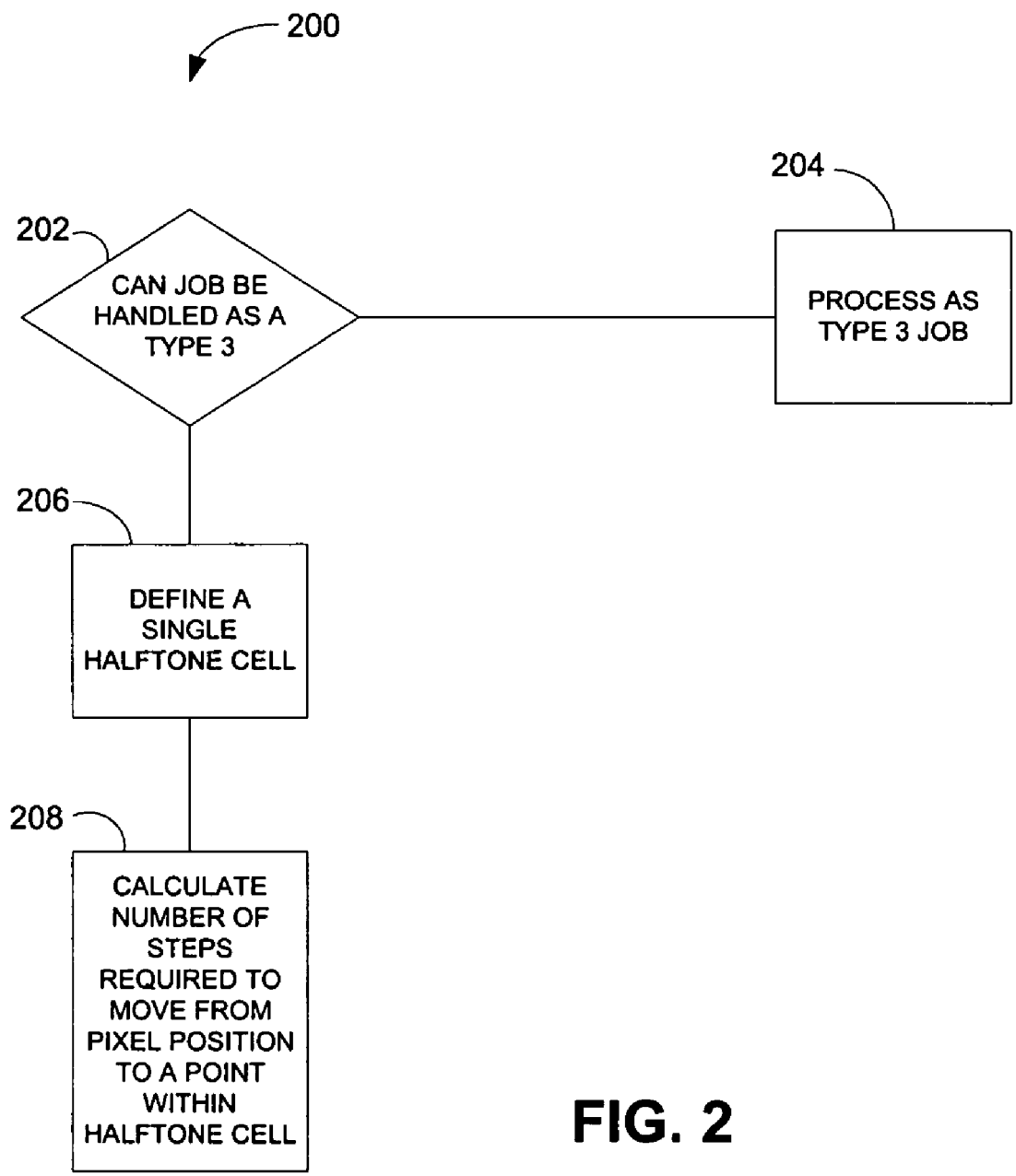
FIG. 2 is a block diagram of a method in accordance with an aspect of the present invention.
Figure 3:
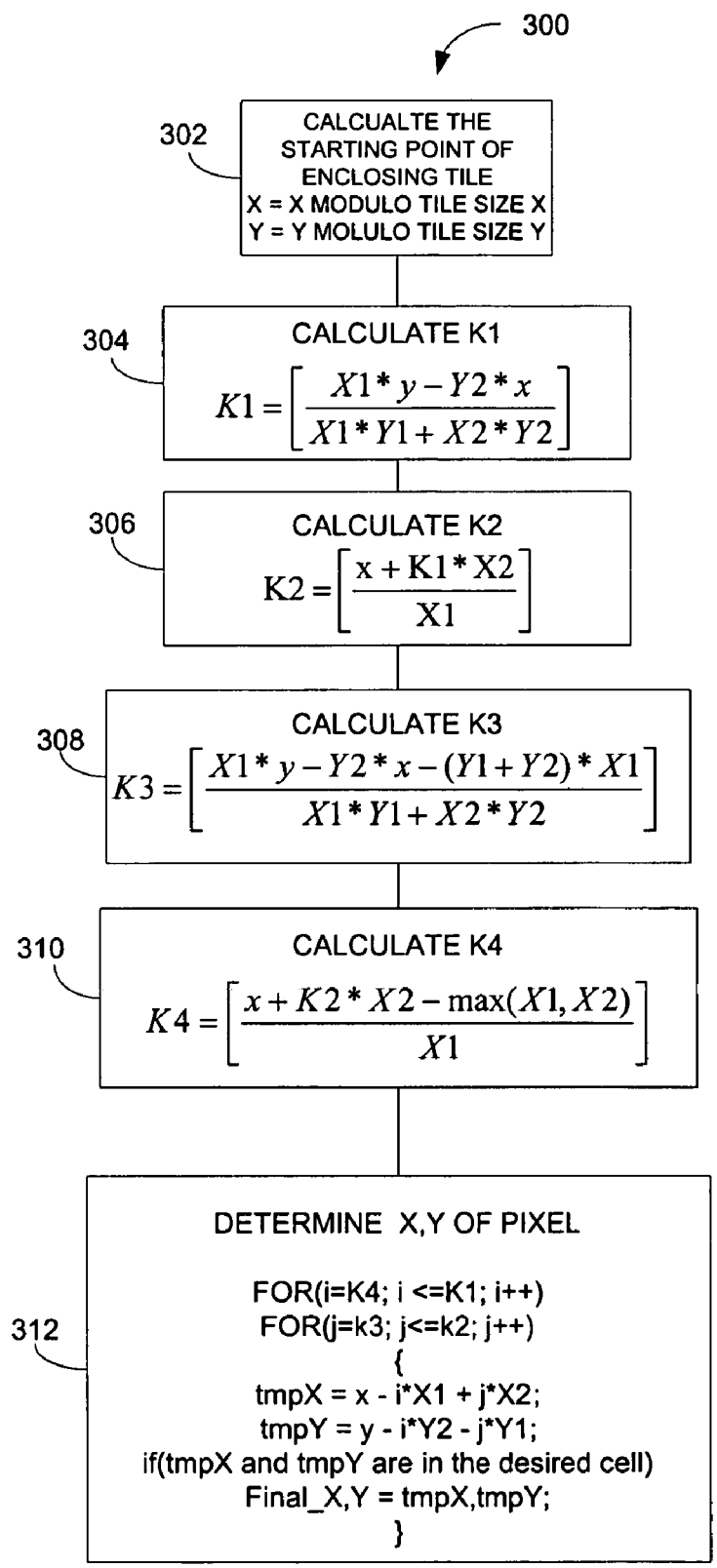
FIG. 3 is a block diagram of a method to calculate the number of steps required to move from a pixel position to a point within a halftone cell in accordance with an aspect of the present invention.

In view of the foregoing features described above, a methodology in accordance with various aspects of the present invention will be better appreciated with reference to FIGS. 2 and 3. While, for purposes of simplicity of explanation, the methodology of FIGS. 2 and 3 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. The methodologies can be implemented in hardware, software, or a combination of hardware and software.

Referring now to FIG. 2, there is illustrated a methodology 200 in accordance with an aspect of the present invention. At 202, it is determined whether the halftoning job can be handled as a Type 3 job. This can be done if the job can be reduced to a smaller Type 3-style rectangle which can be tiled by the halftone cells. The Type-3 rectangle can be used to determine whether colorant should be applied to a given location very quickly. However, the rectangle can be sensitive to the sizes of the two squares (or rectangles) used to make up a halftone cell, and can very easily be larger than a full page, negating any advantage. If the job can be handled as a type 3 job (YES), then at 204 it is processed as a Type 3 job.

If the job cannot be processed as a type 3 halftone (NO), at 206 a single halftone cell is defined. The single halftone cell can be a Type 10 (one or two squares) or a Type 16 (one or two rectangles) cell. At 208, the number of steps required to move from the pixel position to a point within the halftone cell is calculated. In accordance with an aspect of the present invention the cell locations can be quickly calculated, and each pixel rendered quickly, without having to approximate the halftone rectangle with a smaller one and without performing iterative calculations.

FIG. 3 is a block diagram of a methodology 300 to calculate the number of steps required to move from a pixel position outside a halftone cell to a point within the halftone cell in accordance with an aspect of the present invention. At 302, the starting point of the enclosing tile is calculated. As shown in Cartesian coordinates, the x coordinate is calculated by x=x modulo(tile size x), and the y coordinate is calculated by y=y modulo(tile size y).

At 304, 306, 308 and 310 four coefficients K1, K2, K3 and K4 respectively are calculated. As shown in these calculations, one cell of the halftone cell has a width X1 and a height Y1, and the other cell a width X2 and a height Y2. These calculations are performed as follows, $$\text{at } 302, K1 = \left[\frac{X1*y - Y2*x}{X1*Y1 + X2*Y2}\right]; \text{at } 304, K2 = \frac{x + K1*X2}{X1}; \text{at } 306,$$

$$K3 = \left[\frac{X1*y - Y2*x - (Y1+Y2)*X1}{X1*Y1 + X2*Y2}\right];$$

$$\text{and at } 308 \ K4 = \left[\frac{x + K2*X2 - \max(X1, X2)}{X1}\right].$$

At 312, the coefficients K1, K2, K3 and K4 are employed to determine the point within the halftone cell. When rendering a Type 10 or Type 16 halftone cell, the above formula (for K3, K4) usually yields a point that is within the range of (0,0) and (max(X1,X2),Y1+Y2). However, due to the irregular shape of the halftone cell, this point may be in the desired halftone cell or in one of the adjacent cells. As shown, there are four possible solutions. One of the four possible solutions will yield a point within the halftone cell. The following algorithm is used at 313,

```
FOR(i=K4; i <=K1; i++)
    FOR(j=k3; j<=k2; j++)
    {
        tmpX = x - i*X1 + j*X2;
        tmpY = y - i*Y2 - j*Y1;
```

-continued

```
    if(tmpX and tmpY are in the desired cell)
        Final X,Y = tmpX,tmpY;
}.
```

Where Final X,Y are the X and Y coordinates respectively of a point within the halftone cell.

Figure 4:
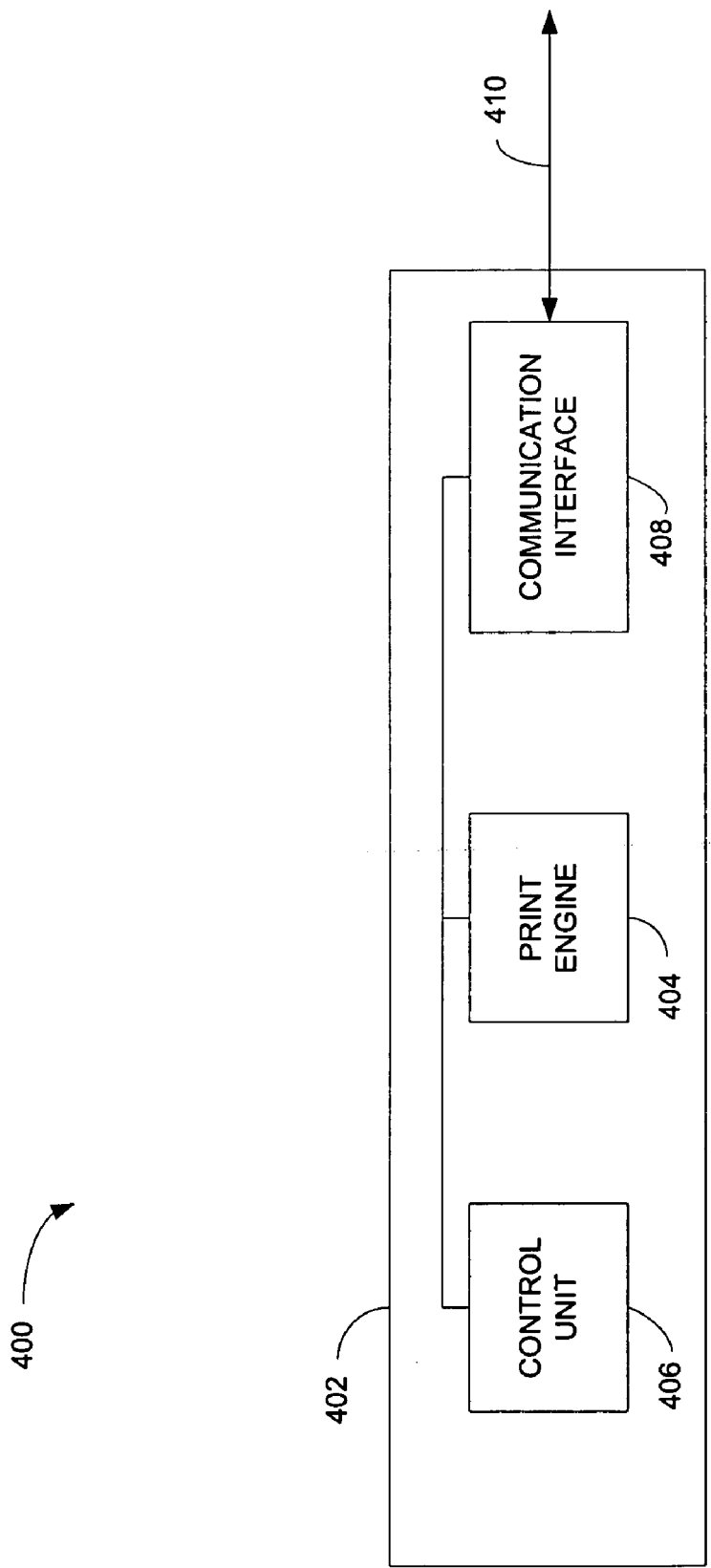
FIG. 4 is a block diagram of an apparatus in accordance with an aspect of the present invention.

FIG. 4 is a block diagram of an apparatus 400 in accordance with an aspect of the present invention. The apparatus 400 comprises an output device 402 for receiving an image and outputting the image using halftoning. Output device 402 comprises a print engine 404, a control unit 406 and a communication interface 408. Control unit 406 controls the operation of print engine 404. Print engine 404 can be a printer, or other image outputting device such as a video screen. Communication interface 408 receives the image for printing via external interface 410. External interface 410 can be any time of communication device, including but not limited to a printer cable, USB connection, Ethernet connection, or other wired or wireless connection. Control unit 406 can have a memory (not shown) for storing the image and for storing calculations used for processing the image. Control unit 406 can be configured to determine whether the halftoning job can be handled as a Type 3 job by determining if the job can be reduced to a smaller Type 3-style rectangle which can be tiled by the halftone cells. If the job cannot be processed as a Type 3 halftone a single halftone cell is defined. The single halftone cell can be a Type 10 (one or two squares) or a Type 16 (one or two rectangles) cell. In accordance with an aspect of the present invention the cell locations can be quickly calculated, and each pixel rendered quickly, without having to approximate the halftone rectangle with a smaller one and without performing iterative calculations.

If the job cannot be processed as a Type 3 halftone, control unit 406 can be configured to define a single halftone cell. The single halftone cell can be a Type 10 (one or two squares) or a Type 16 ( one or two rectangles) cell. The number of steps required to move from the pixel position outside the halftone cell to a point within the halftone cell is calculated. In accordance with an aspect of the present invention the cell locations can be quickly calculated, and each pixel rendered quickly, without having to approximate the halftone rectangle with a smaller one and without performing iterative calculations.

In accordance with an aspect of the present invention, control unit 406 can be configured to perform one set of calculations for transforming a pixel outside the halftone cell to a point inside the halftone cell. In transforming the point a plurality of coefficient can be calculated, K1, K2, K3 and K4 which are described as $$K1 = \left[\frac{X1*y - Y2*x}{X1*Y1 + X2*Y2}\right]$$

$$K2 = \frac{x + K1*X2}{X1}$$

$$K3 = \left[\frac{X1*y - Y2*x - (Y1+Y2)*X1}{X1*Y1 + X2*Y2}\right]$$

$$K4 = \left[\frac{x + K2*X2 - \max(X1, X2)}{X1}\right].$$

Where X1, Y1 are the height and width of one rectangular cell used to define the halftone cell, and X2, Y2 are the height and weight of a second cell used to define the halftone cell.

When rendering a Type 10 or Type 16 halftone cell, the above formula (for K3, K4) usually yields a point that is within the range of (0,0) and (max(X1,X2),Y1+Y2). However, due to the irregular shape of the halftone cell, this point may be in the desired halftone cell or in one of the adjacent cells (although it is most often within the desired cell). Stepping through all of the adjacent pixels requires a much simpler calculation once K1-K4 are known, and is faster than traditional iterative processes for any point more than a few halftone cells away from the origin. An example code for selecting the correct point follows.

```
DETERMINE X,Y OF PIXEL
FOR(i=K4; i <=K1; i++)
    FOR(j=k3; j<=k2; j++)
    {
        tmpX = x - i*X1 + j*X2;
        tmpY = y - i*Y2 - j*Y1;
        if(tmpX and tmpY are in the desired cell)
            Final_X,Y = tmpX,tmpY;
    }.
```

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

What is claimed is:

1. A method for mapping a pixel outside a halftone cell to a point inside the halftone cell, comprising:
   determining the size of a rectangle which is tiled exactly by the halftone cell, wherein the halftone cell is defined by two rectangular shapes, the first rectangular shape having a width X1 and a height Y1; and the second rectangular shape having a width X2 and a height Y2;
   using a threshold array to render the point when the size of the rectangle size permits; and
   calculating a plurality of potential solutions for rendering the pixel when the size of the rectangle is too large for a threshold array and selecting one of the plurality of potential solutions based on the locations of the plurality of potential solutions with respect to the halftone cell,
   wherein calculating the plurality of potential solutions includes calculating a starting point of an enclosing tile in Cartesian coordinates having an x component and a y component, wherein
      x=x modulo tile size x; and
      y=y modulo tile size y; and
   calculating four coefficients wherein
      wherein the first coefficient, $$K1 = \left[\frac{X1*y - Y2*x}{X1*Y1 + X2*Y2}\right];$$

wherein the second coefficient, $$K2 = \left[\frac{x + K1*X2}{X1}\right];$$

wherein the third coefficient, $$K3 = \left[\frac{X1*y - Y2*x - (Y1+Y2)*X1}{X1*Y1 + X2*Y2}\right];$$

and
wherein the fourth coefficient, $$K4 = \left[\frac{x + K2*X2 - \max(X1, X2)}{X1}\right].$$

2. The method of claim 1, the threshold array comprising
a width defined in pixels;
a height defined in pixels; and
a string containing threshold values corresponding to pixels contained within the width and height.

3. The method of claim 1, wherein the point inside the halftone cell is based on the x component and y component based on adjustments using coefficients K1, K2, K3 and K4.

4. The method of claim 3, the point inside the halftone cell is selected based on the formula $tmpx=x-i*X1+j*X2;$ $tmpy=y-i*Y2$ and $j*Y1;$ wherein i ranges from K4 to K1 and j ranges from K3 to K2.

5. The method of claim 4, wherein X1 equals Y1 and X2 equals Y2.

6. A device for halfioning, comprising:
a output engine;
a control unit coupled to the output engine; and
a communication interface coupled to the output engine and the control unit;
wherein the control unit is configured to receive an image from the communication interface and to produce a halftone facsimile of the image via the output engine by defining a halftone screen;
  defining a halftone cell within the halftone screen, wherein the halftone cell is defined by two rectangular shapes, the first rectangular shape having a width Xl and a height Y1; and the second rectangular shape having a width X2 and a height Y2;
  mapping a pixel outside the halftone cell and within the halftone screen to a point inside the halftone cell by:
  determining the size of a rectangle which is tiled exactly by the halftone cell;
  using a threshold array to render the pixel when the size of the rectangle size permits; and
  calculating a plurality potential solutions for rendering the pixel when the size of the rectangle is too large for a threshold array and selecting one of the plurality potential solutions based on the locations of the plurality potential solutions with respect to the halftone cell,
wherein calculating the plurality of potential solutions includes calculating a starting point of an enclosing tile in Cartesian coordinates having an x component and a y component, wherein x=x modulo tile size x; and
y=y modulo tile size y; and
calculating four coefficients wherein
wherein the first coefficient, $$K1 = \left[\frac{X1*y - Y2*x}{X1*Y1 + X2*Y2}\right];$$

wherein the second coefficient, $$K2 = \left[\frac{x + K1*X2}{X1}\right];$$

wherein the third coefficient, $$K3 = \left[\frac{X1*y - Y2*x - (Y1+Y2)*X1}{X1*Y1 + X2*Y2}\right];$$

and
wherein the fourth coefficient, $$K4 = \left[\frac{x + K2*X2 - \max(X1, X2)}{X1}\right];$$

and the final x and final y coordinates of the pixel are mapped to the halftone cell based on the formula $tmpx=x-i*X1+j*X2;$ $tmpy=y-i*Y2$ and $j*Y1;$ wherein i ranges from K4 to K1 and j ranges from K3 to K2 and final x and final y are selected to correspond to a tmpx value and a tmpy value that are mapped to a point inside the halftone cell.

7. A computer readable instructions stored in a computer readable medium, comprising:
means for defining a halftone cell within a halftone screen, wherein the halftone cell is defined by two rectangular shapes, the first rectangular shape having a width X1 and a height Y1; and the second rectangular shape having a width X2 and a height Y2;
means for determining the size of a rectangle which is tiled exactly by the halftone cell;
means for mapping a pixel outside the halftone cell and within the halftone screen to a point inside the halftone cell,
the means for mapping comprising means for using a threshold array to render the pixel when the size of the rectangle size permits; and
the means for mapping comprising means for calculating four potential solutions for rendering the pixel when the size of the rectangle is to large for a threshold array and selecting a one of the four potential solutions based on the locations of the four potential solutions with respect to the halftone cell, wherein the means for calculating the plurality of potential solutions includes means for calculating a starting point of an enclosing tile in Cartesian coordinates having an x component and a y component, wherein
x=x modulo tile size x; and
y=y modulo tile size y; and means for calculating four coefficients wherein
wherein the first coefficient, $$K1 = \left[\frac{X1*y - Y2*x}{X1*Y1 + X2*Y2}\right];$$

wherein the second coefficient, $$K2 = \left[\frac{x + K1*X2}{X1}\right];$$

wherein the third coefficient, $$K3 = \left[\frac{X1*y - Y2*x - (Y1 + Y2)*X1}{X1*Y1 + X2*Y2}\right];$$

and
wherein the fourth coefficient, $$K4 = \left[\frac{x + K2*X2 - \max(X1, X2)}{X1}\right];$$

and the final x and final y coordinates of the pixel are mapped to the halftone cell based on the formula $tmpx=x-i*X1+j*X2;$ $tmpy=y-i*Y2$ and $j*Y1;$ wherein i ranges from K4 to K1 and j ranges from K3 to K2 and final x and final y are selected to correspond to a tmpx value and a tmpy value that are mapped to a point inside the halftone cell.

* * * * *